(12) United States Patent
Schubitschew et al.

(10) Patent No.: US 10,737,211 B2
(45) Date of Patent: Aug. 11, 2020

(54) PRESSURE MEDIUM UNIT, IN PARTICULAR FOR SETTING AND/OR REGULATING A BRAKE PRESSURE IN A VEHICLE BRAKE SYSTEM HAVING ELECTRONIC SLIP REGULATION, AND CAP-SHAPED FILTER ELEMENT

(71) Applicant: Robert Bosch GmbH, Stuttgart (DE)

(72) Inventors: Valentin Schubitschew, Tamm (DE); Andrej Gardt, Abstatt (DE); Volker Edelmann, Buchen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/053,362

(22) Filed: Aug. 2, 2018

(65) Prior Publication Data
US 2019/0047534 A1    Feb. 14, 2019

(30) Foreign Application Priority Data

Aug. 9, 2017  (DE) .......................... 10 2017 213 885

(51) Int. Cl.
*B01D 46/24*    (2006.01)
*B60T 15/36*    (2006.01)
(Continued)

(52) U.S. Cl.
CPC ......... *B01D 46/2414* (2013.01); *B01D 29/15* (2013.01); *B01D 35/02* (2013.01);
(Continued)

(58) Field of Classification Search
CPC ........... Y10T 137/794; Y10T 137/8085; Y10T 137/8122; B01D 46/2414; B01D 35/26; B01D 35/02; B60T 15/36; B60T 8/3615; B60T 17/221; B60T 8/17; B60T 8/3675; B60T 8/363; B60T 2270/10; B60T 2270/203; B60T 2270/306
See application file for complete search history.

(56) References Cited

U.S. PATENT DOCUMENTS 3,482,597 A * 12/1969 Smith, Jr. .............. D01D 1/065
                                                    137/544
8,141,959 B2 *  3/2012 Ota ....................... B60T 8/3675
                                                    251/129.14
(Continued)

*Primary Examiner* — Atif H Chaudry
(74) *Attorney, Agent, or Firm* — Norton Rose Fulbright US LLP; Gerard Messina

(57) ABSTRACT

A pressure medium unit, in particular for setting and/or regulating a brake pressure in a vehicle brake system having electronic slip regulation, and to a cap-shaped filter element. Pressure medium units are equipped with a housing block having a duct formed therein that conducts pressure medium, a control element that controls a cross-section of the duct, and a filter element assigned to the control element and fixed in the interior of the duct. According to the present system, the filter element is formed in the shape of a cap, and has on its outer circumference a radially protruding fixing segment having an elastically deformable cross-section. A fixing segment realized in this manner compensates differences in expansion between the components caused by changes in temperature, prevents play at the filter element, and provides a particularly good filter effect.

11 Claims, 2 Drawing Sheets

(51) Int. Cl.
  *G05D 16/20* (2006.01)
  *B01D 29/15* (2006.01)
  *B01D 39/10* (2006.01)
  *B60T 17/22* (2006.01)
  *B60T 8/36* (2006.01)
  *B60T 8/00* (2006.01)
  *B60T 8/17* (2006.01)
  *B01D 35/26* (2006.01)
  *B01D 35/02* (2006.01)

(52) U.S. Cl.
  CPC ............ *B01D 35/26* (2013.01); *B01D 39/10* (2013.01); *B60T 8/00* (2013.01); *B60T 8/17* (2013.01); *B60T 8/3615* (2013.01); *B60T 15/36* (2013.01); *B60T 17/221* (2013.01); *G05D 16/2013* (2013.01); *G05D 16/2066* (2013.01); *B01D 2201/16* (2013.01); *B01D 2201/347* (2013.01); *B01D 2201/40* (2013.01); *B60T 8/363* (2013.01); *B60T 8/3675* (2013.01); *B60T 2270/10* (2013.01); *B60T 2270/203* (2013.01); *B60T 2270/306* (2013.01); *Y10T 137/794* (2015.04); *Y10T 137/8085* (2015.04); *Y10T 137/8122* (2015.04)

(56) References Cited

U.S. PATENT DOCUMENTS

| | | | |
|---|---|---|---|
| 2005/0067028 A1* | 3/2005 | Ryuen | F16K 31/0665 137/596.17 |
| 2008/0047242 A1* | 2/2008 | Durocher | B01D 39/12 55/505 |

\* cited by examiner

PRESSURE MEDIUM UNIT, IN PARTICULAR FOR SETTING AND/OR REGULATING A BRAKE PRESSURE IN A VEHICLE BRAKE SYSTEM HAVING ELECTRONIC SLIP REGULATION, AND CAP-SHAPED FILTER ELEMENT

RELATED APPLICATION INFORMATION

The present application claims priority to and the benefit of German patent application no. 10 2017 213 885.8, which was filed in Germany on Aug. 9, 2017, the disclosure which is incorporated herein by reference.

FIELD OF THE INVENTION

The present invention relates to a pressure medium unit, in particular for setting and/or regulating a brake pressure in a vehicle brake system having electronic slip regulation, and to a cap-shaped element.

BACKGROUND INFORMATION

In the following, vehicle brake systems having slip regulation are understood as hydraulic brake systems having anti-lock protection (ABS), anti-slip regulation (ASR), and/or driving dynamics regulation (ESP), in which the brake pressure of the wheel brakes is set as a function of the slippage conditions at each of the associated wheels. This pressure adaptation can be carried out automatically, i.e. without driver involvement, or with involvement of the driver. The pressure medium units used for this purpose have, inter alia, a housing block equipped with pressure producers, storage units, and control valves, in which block a multiplicity of pressure medium-conducting ducts are configured in order to connect the named components, or the receptacles formed in the housing block for these components, with one another so as to conduct pressure medium. The control valves are electronically controllable and permit modification of the cross-section of an associated duct in order to control pressure as needed. For this purpose, an electronic control device is present that carries out an adapted electronic controlling of the control valves as a function of the brake pressure to be set. In addition, the electronic control device also controls a motor, attached to the housing block, that actuates the pressure producers.

Contaminants that may be present in the pressure medium can cause damage to the components that control the pressure medium, in particular the control valves, and can result in undesirable leaks. In order to avoid these disadvantages, it is known from the existing art to equip pressure medium units with filter elements.

FIG. 1 shows a pressure medium unit 10 of applicant, known from the existing art, having a housing block 12, a control valve 14 situated on this housing block 12, and a filter element 16 that is situated in the interior of a pressure medium-conducting duct 18, also configured on housing block 12. An axial filter 20 is assigned to control valve 14 in order to filter contaminants out from the pressure medium before this pressure medium enters into control valve 14. For this purpose, axial filter 20 is for example anchored at a position at which a second duct 22 opens into first duct 18. Axial filter 20 is made up of a hollow cylindrical filter framework, having openings made on its circumference. Pressure medium flows through these openings, and the openings are covered by a filter mesh having a defined mesh size. Pressure medium flows out from second duct 22 through the mesh weave of the filter mesh, into the hollow interior of axial filter 20, where it is diverted and, in the filtered state, flows through the open end of axial filter 20, facing control valve 14. With its second end, facing away from control valve 14, the axial filter is supported on the base of first duct 18, configured as a blind hole.

The mentioned filter framework is standardly made of plastic, and can be injection-molded onto the filter mesh. It lends stability to the filter mesh, which is flexible in itself, so that axial filter 20 can be introduced into the pressure medium-conducting first duct 18 with radial pre-tension, and can be placed therein. Accordingly, a non-positive connection exists between axial filter 20 and the wall of duct 18, by which axial filter 20 is fixed circumferentially in a sealing manner in duct 18. In the depicted case, an axial fixing of axial filter 20 in first duct 18 takes place by pressing in axial filter 20 until it contacts the base of first duct 18, and through the subsequent mounting of control valve 14, which in the assembled state lies against the first end, at the outflow side, of axial filter 20 with a valve connecting piece that extends in the direction of assembly. Because the spacing between the end face of the valve connecting piece and the base of first duct 18 is standardly somewhat smaller than the length of axial filter 20, in the assembled state additional axial pre-tension forces act on axial filter 20.

It is known that as a result of changes in temperature, components made of different materials expand by different amounts, or contract by different amounts when there is a corresponding cooling. An axial filter 20 made essentially of plastic expands more, given increasing temperatures, than does the surrounding housing block 12 or control valve 14, which are both made predominantly of metal. In the case of, for example, decreasing temperatures, this can result in the occurrence of axial and/or radial play at axial filter 20, or axial filter 20 can execute small movements in the interior of first duct 18. In the extreme case, a hydraulic bypass of axial filter 20 may even arise, through which unfiltered pressure medium can penetrate to control valve 14, where it can cause damage or leaks.

SUMMARY OF THE INVENTION

On the basis of this technical background, the present invention is therefore based on the object of proposing a pressure medium unit having a filter element, in which this filter element is advantageously further developed with regard to its sealing effect under conditions of changing temperature.

A pressure medium unit having the features described herein has, in contrast, the advantage that a radial and/or axial play that occurs at the filter element when there are changes in temperature is compensated or prevented. The arising of a hydraulic bypass around the filter element is avoided, and pressure medium-controlling components that are situated downstream from the filter element in the pressure medium circuit are protected more reliably against potential damage or leaks caused by contamination.

According to the present invention, for this purpose the filter element has, along its outer circumference, a fixing segment that protrudes radially outward and whose cross-section is elastically deformable.

Further advantages or advantageous development of the present invention result from the further descriptions herein and/or from the following description.

The fixing segment according to the present invention forms a hollow element having an annular gap running along the outer circumference of the filter body. A filter element having such a fixing segment may be made in one piece of metal. On the one hand, this reduces differences in expansion, caused by changes in temperature, between the filter element and the surrounding components, and on the other hand it simplifies the process of producing the filter element. In addition, the filter element and control valve together form an assembly that can be pre-assembled, having compact dimensions in the axial direction, and which can be anchored on the housing block in a single work step. An undesired deformation that may occur during assembly of the pressure medium unit, or damage to the filter mesh of the filter element, and consequently a worsening of the flow resistance of the filter element under operating conditions, is largely excluded by a filter element formed in accordance with the present invention. The lower support forces in the radial and axial direction of the proposed filter element also contribute to this. In addition, lower support forces are associated with lower assembly forces, and thus fewer potential risks of creating chips or shavings when a control valve is assembled to the housing block.

An exemplary embodiment of the present invention is shown in the drawings and is explained in more detail in the following description.

DETAILED DESCRIPTION

Figure 1:
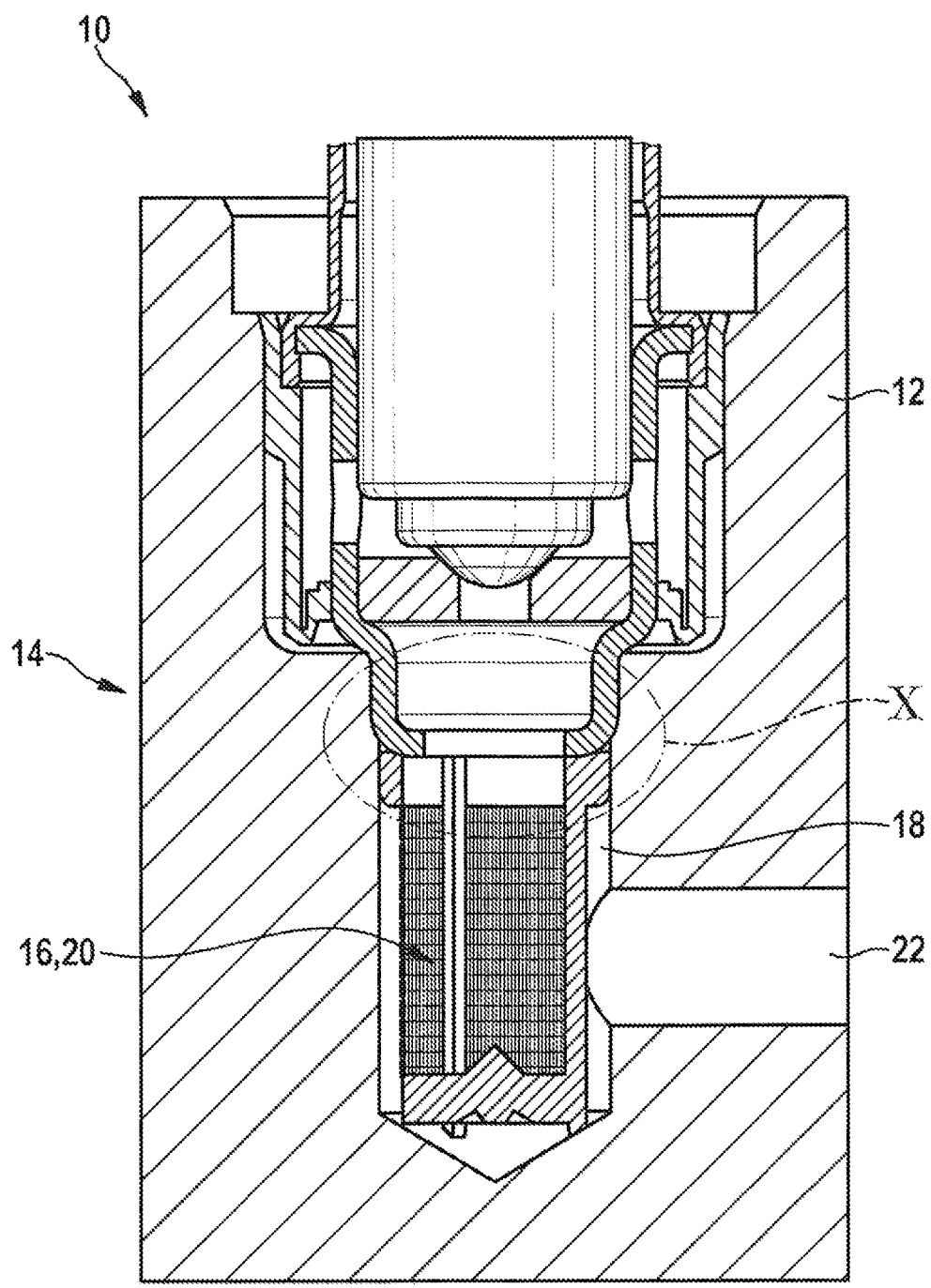
FIG. 1 shows the known existing art of applicant, described above.
Figure 2:
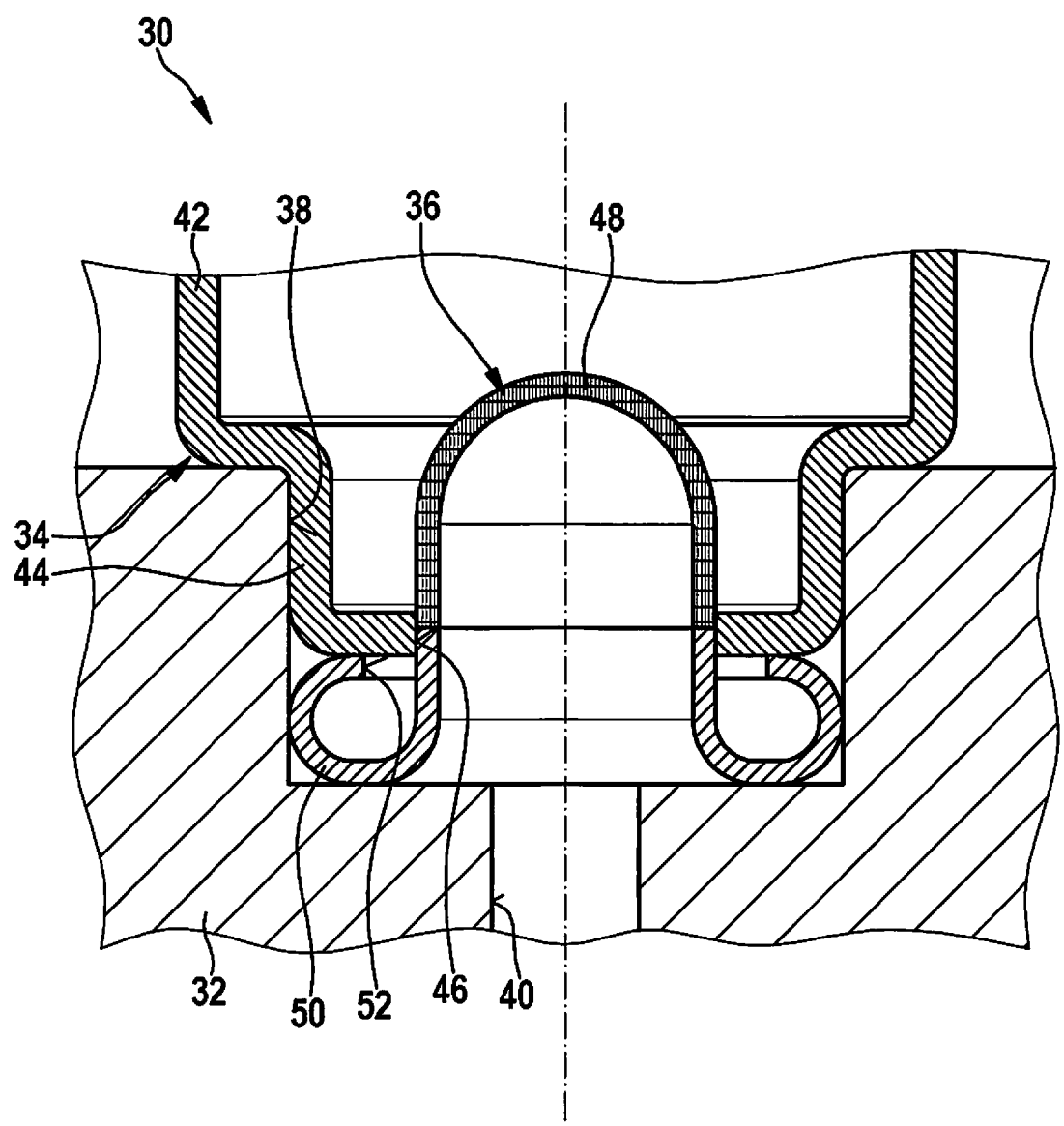
FIG. 2 shows, on the basis of the detail X of FIG. 1, a simplified representation of a pressure medium unit forming the basis of the present invention, in longitudinal section.

In FIG. 2, a pressure medium unit 30 is shown that is made up of a housing block 32, a control valve 34 anchored on housing block 32, and a filter element 36 configured according to the present invention. A receptacle 38 for control valve 34 is configured on housing block 32. This is a blind hole-type bore that opens at an outer side of housing block 32, and whose base is situated in the interior of housing block 32. The transition from a bore wall surrounding the bore to the base of the bore is formed as a right angle. The named receptacle is connected to a circuit (not further shown) that conducts pressure medium via a duct 40 that opens at the base of the bore.

As stated, control valve 34 is set into receptacle 38, but in the Figure only a valve housing 42, defining an outer contour of the control valve, is shown. This valve housing 42 has a hollow cylindrical shape whose outer diameter has one right-angled constriction. At the point of the reduction in diameter, valve housing 42 has a horizontal circumferential shoulder by which control valve 42 lies flush against the outer side of the housing block. Control valve 34 extends into the interior of receptacle 38 with a connecting piece 48 having the smaller outer diameter. On the end face of this connecting piece 44 situated in the interior of receptacle 38, an opening 46 is centrically placed, through which control valve 34 is supplied with pressure medium. An opening diameter is here surrounded by an annular end face of valve housing 42.

Between the end face, provided with opening 46, of valve housing 42 and the base of receptacle 38, there is an axial spacing in the direction of the longitudinal axis of control valve 34. Filter element 36 is partly accommodated in the resulting installation space. This filter element 36 is made with the shape of a cap, and is made up of a filter dome 48, which extends into the interior of control valve 34 through opening 46 in valve housing 42, and a fixing segment 50, accommodated outside control valve 34 in the installation space between the end face of control valve 34 and the base of receptacle 38.

Filter dome 48 and fixing segment 50 may form a one-part constructive element made of a filter mesh. The filter mesh is a woven mesh of metal, which may be made of steel plate, whose mesh size can be selected as a function of the contaminants that are to be expected in the pressure medium, and of the permissible throttling characteristics given changing temperatures of the pressure medium, in accordance with the specific application. Filter dome 48 of filter element 36 and opening 46 of valve housing 42 are matched in their respective dimensions in such a way that filter element 36 can be fastened in a captive manner with a non-positive fit on control valve 34 before this assembly is mounted on housing block 32.

Fixing segment 50 of filter element 36 is formed on the open end of filter dome 48, and protrudes radially outward from this filter dome 48. It is formed as a circumferential hollow body;

in the depicted case of application, it is an annular bead having a circular cross-section. This hollow body is not closed in its cross-section, but rather is open to the surrounding environment via an annular gap 52. Due to such a configuration, fixing segment 50 has a relatively high degree of shape elasticity both in the radial and in the axial direction of extension. The outer dimensions of fixing segment 50 of filter element 36 are here adapted to the inner diameter of receptacle 38 of housing block 32, and to the spacing between the end face of valve housing 42 and the base of receptacle 38, in such a way that, in the mounted state of pressure medium unit 30, fixing segment 50 is installed so as to be pre-tensioned both in the radial direction and in the axial direction. This means that in the assembled state of pressure medium unit 30, fixing segment 50 is seated in a sealing manner, with pre-tension, on the border wall of receptacle 38, on the base of receptacle 38, and on the end face, surrounding opening 46 of valve housing 42, of control valve 34, so that a hydraulic bypass around filter element 36 is not permitted to arise. Through its dimensioning, and through its elasticity of shape due to the choice of material and shape, the pre-tensioning of fixing segment 50 can be defined in such a way that expansions or contractions of the components caused by changes in temperature do not endanger the sealing effect of fixing segment 50.

In the exemplary embodiment, the circular annular cross-section of fixing segment 50 can be produced for example by rolling in the open end of filter element 36. This production method has the result that annular gap 52 of the hollow body is situated immediately along the circumference of filter dome 48. This configuration of annular gap 52 has the advantage that, in the assembled state of pressure medium unit 30, this gap is then covered by the end face, surrounding opening 46, of control valve 34.

Of course, modifications or additions to the described exemplary embodiment are conceivable without departing from the fundamental idea of the present invention. In this context, it is to be noted that the present invention has been explained only in connection with hydraulic vehicle brake systems, but is not intended to be limited thereto. The present invention is also easily applicable to pressure medium units that control a pressure, or a quantity of pressure medium, in a pneumatic pressure circuit.

What is claimed is:

1. A pressure medium unit, for setting and/or regulating a brake pressure in a vehicle brake system having electronic slip regulation, comprising:
    a housing block having a duct that conducts pressure medium, having a control element that controls a flow rate of pressure medium in the duct, and having a filter element that is assigned to the control element and is situated in the duct;
    wherein the filter element is configured in the shape of a cap, and has, along its outer circumference, a fixing segment that protrudes radially outward and has an elastically deformable cross-section;
    wherein the filter element has a filter dome with which it protrudes into the interior of the control element through an opening that supplies this control element with a pressure medium, the filter element is held with a non-positive fit in the opening of the control element, and the fixing segment of the filter element is situated outside the control element, and lies against an end face of the control element surrounding the opening.

2. The pressure medium unit of claim 1, wherein the fixing segment includes an open hollow body having a circumferential annular gap.

3. The pressure medium unit of claim 2, wherein the fixing segment has a circular cross-section, and the annular gap is situated on a region of this cross-section facing the control element.

4. The pressure medium unit of claim 1, wherein in the assembled state of the pressure medium unit, the filter element is situated, with the fixing segment, between a stop on the housing block and the control element anchored on the housing block, with axial pre-tension, and the fixing segment lies in a radially sealing manner against a wall of the pressure medium-conducting duct of the housing block.

5. The pressure medium unit as recited in claim 1, wherein the control element is a control valve.

6. A pressure medium unit, for setting and/or regulating a brake pressure in a vehicle brake system having electronic slip regulation, comprising:
    a housing block having a duct that conducts pressure medium, having a control element that controls a flow rate of pressure medium in the duct, and having a filter element that is assigned to the control element and is situated in the duct;
    wherein the filter element is configured in the shape of a cap, and has, along its outer circumference, a fixing segment that protrudes radially outward and has an elastically deformable cross-section;
    wherein the filter element has a filter dome with which it protrudes into the interior of the control element through an opening that supplies this control element with a pressure medium, and the fixing segment of the filter element is situated outside the control element wherein the fixing segment of the filter element lies against an end face of the control element surrounding the opening.

7. The pressure medium unit as recited in claim 6, wherein the control element is a control valve.

8. The pressure medium unit of claim 6, wherein the fixing segment includes an open hollow body having a circumferential annular gap.

9. The pressure medium unit of claim 8, wherein the fixing segment has a circular cross-section, and the annular gap is situated on a region of this cross-section facing the control element.

10. The pressure medium unit of claim 8, wherein in the assembled state of the pressure medium unit, the filter element is situated, with the fixing segment, between a stop on the housing block and the control element anchored on the housing block, with axial pre-tension, and the fixing segment lies in a radially sealing manner against a wall of the pressure medium-conducting duct of the housing block.

11. The pressure medium unit of claim 6, wherein the filter element is held with a non-positive fit in the opening of the control element.

* * * * *